UNITED STATES PATENT OFFICE.

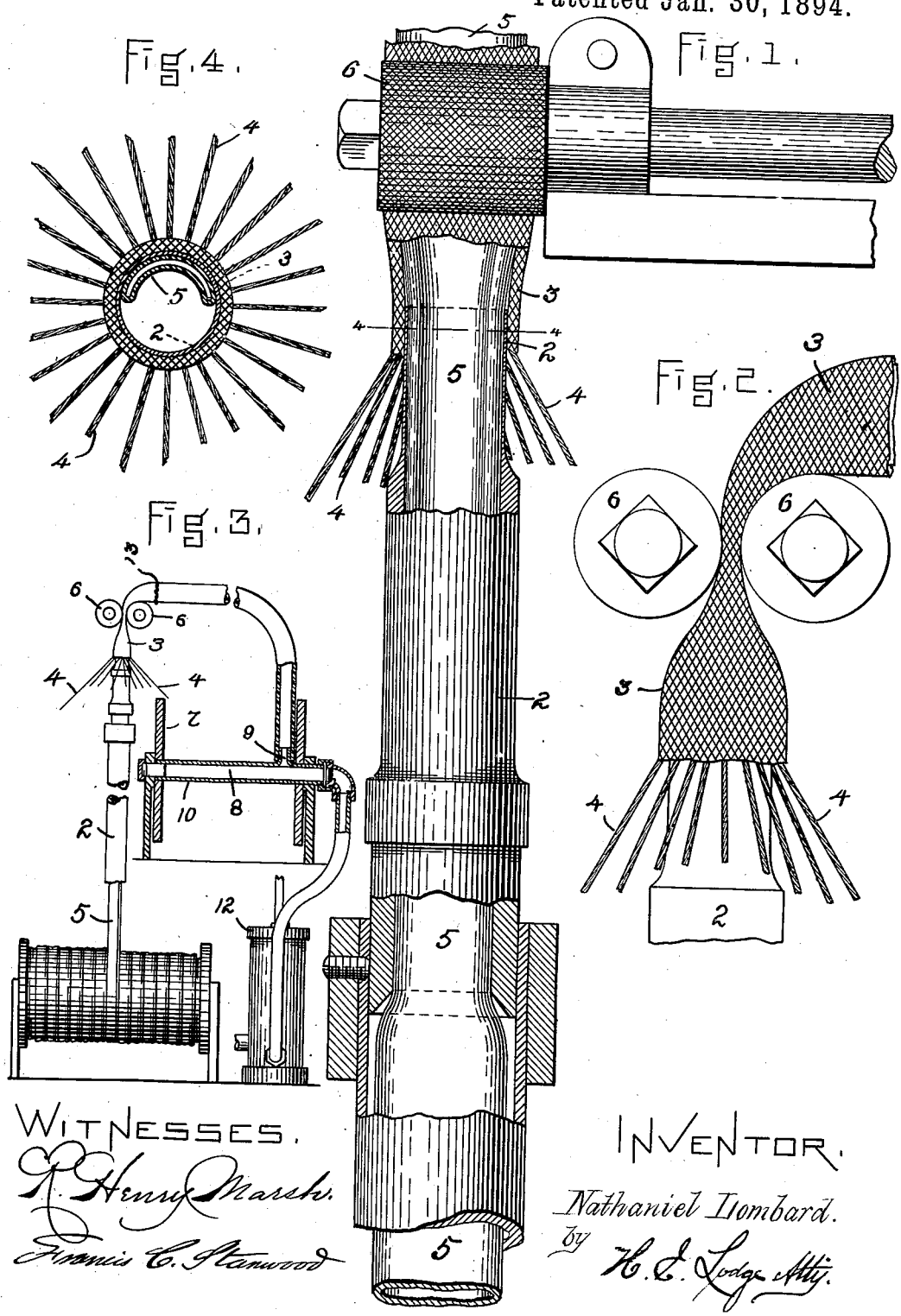

NATHANIEL LOMBARD, OF BOSTON, ASSIGNOR OF ONE-HALF TO HENRY A. CLARK, OF BROOKLINE, MASSACHUSETTS.

MANUFACTURE OF HOSE.

SPECIFICATION forming part of Letters Patent No. 513,799, dated January 30, 1894.

Application filed May 1, 1893. Serial No. 472,582. (No specimens.)

*To all whom it may concern:*

Be it known that I, NATHANIEL LOMBARD, a citizen of the United States, residing at Boston, in the county of Suffolk and State of Massachusetts, have invented certain new and useful Improvements in Methods of Manufacturing Woven Rubber Hose; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to the manufacture of woven hose, so called, or that class of hose which is composed of an inner water-tight tube of rubber, and an exterior covering of textile material adapted to furnish the strength required to resist the internal pressure of liquid within the hose, whether for fire or other purposes.

My invention is embodied in the method of manufacturing woven hose, which, briefly described, consists in providing first, a continuous piece of soft rubber tube; second, in weaving or forming the exterior textile covering thereabout, as said rubber tube is fed along in a collapsed condition by suitable mechanism; third, in inflating said tube with air or other gas; fourth, in closing the ends of said tube to maintain such inflation, and lastly subjecting said tube, while in an inflated condition, within an oven heated to a proper temperature for purposes of vulcanization.

The drawings accompanying this specification illustrate one form of mechanism by which I propose to carry out the method of manufacturing rubber hose under my invention.

Figure 1 is a sectional partial view of a braiding machine showing the hollow sleeve through which the rubber tube passes interiorly, while the covering tube is formed exteriorly thereof. Fig. 2 represents the pressure rolls which divide the inflated from the uninflated portion of the hose. Fig. 3 is a diagram of mechanism illustrating my method. Fig. 4 is a transverse section on line 4. 4. in Fig. 1.

In the present state of the art and so far as my knowledge extends woven rubber hose has been made in lengths necessarily limited, owing to the peculiar method employed, which consists in the use of a metallic mandrel or core of a length equal to the length of hose to be produced. This mandrel not only served to maintain the rubber tube in an expanded condition during the process of covering it with a textile tube which was woven about said rubber tube, but further served to keep the latter distended during the act of vulcanization.

The object of my invention and method is not only to enable the manufacturer to produce rubber hose of any length, but to expedite the process, and likewise to cheapen the product, since under my method the hose can be made in one continuous piece and merely requires that it should be severed or cut into suitable lengths, which are transferred to the ovens to be vulcanized.

In the drawings which illustrate my method I have shown a fragmentary view of a weaving or braiding machine of any desirable type, and have indicated a metallic sleeve at 2. Exteriorly about and upon this sleeve is formed the covering tube 3 of textile material and produced from the several threads 4. Preparatory to the weaving or formation of the outer covering tube a continuous piece of soft rubber tube 5 of any length and wound upon a reel is placed in proximity to the weaving apparatus and fed along at a rate to conform with the production of the tube 3 by means of feed rolls 6. 6. The latter are located preferably above the sleeve, so as to grip and advance the finished woven tube 3, which now incloses the soft rubber tube, the latter traveling through the bore of the sleeve, as shown. This product which now consists of the woven outer covering tube 3, and the soft rubber tube 5, both in a collapsed condition, is now in readiness to be vulcanized, or that act which not only cures and hardens the rubber tube, but causes the material composing the latter to enter the interstices of the outer covering and in this way the two tubes are made to adhere together as an integral piece. Prior to the act of vulcanizing, the product is to be temporarily stored or deposited upon a reel until the desired length of hose has been made, when the hose is cut, and an empty reel substituted for the full one, which may be removed to the ovens. In order to have the product upon this full reel in readiness for the oven, that it may be heated and in this way vulcanized, I proceed as follows, which act is an important step in my method, as herein described. The winding reel 7 is provided with a central pipe 8 having a swivel connection at one end, the outer, which connects with the supply pipe from an air pump 12, as preferably air is the most suitable element for the duty required. The inner end 9 is extended and emerges upon the outer surface of the reel core 10, and is adapted to receive the end of the hose, as it comes from the weaving machine. After this attachment is made air, or gas under pressure, is admitted and inflation of the hose takes place, such inflation extending only to the feed rolls 6, 6, which may be forcibly held together to prevent the air from escaping at this point. Hence it is evident that as fast as the outer covering is made and formed about the soft rubber tube it is passed between the feed rolls and after emerging from between the latter, it is then inflated and so wound upon the reel in a condition ready for immediate transfer to the heating oven, and of a shape such as it will assume when sent forth as a finished product. After winding a sufficient quantity of this product upon a reel, the outer end of the pipe 8 is closed by means of a valve (not shown) or otherwise, while a ligature or clamp 13 is firmly fastened about the hose and the latter severed at or near this point, but beyond the fastening. In this way the inner tube is maintained in an expanded state and the pressure, which is now exerted, only serves to cause the rubber of said tube, when in a soft condition, to more thoroughly permeate and enter the open parts of the covering tube. In this way the inner rubber and the outer textile tubes are firmly knit together and form an integral product.

As the description of my process for producing woven rubber hose required illustration of one form of machine or apparatus, such novel features, as are herein shown and described, but not claimed, I propose to embody in future and subsequent applications.

What I claim is—

1. The method of manufacturing woven rubber hose, which consists in covering a continuous rubber tube in a collapsed condition with a woven tube, in closing the ends of said tube and inflating the latter, subsequently subjecting said hose while in an inflated condition to proper temperature to cause vulcanization, substantially as herein set forth.

2. The process of manufacturing woven rubber hose, which consists in weaving about a continuous rubber tube an outer covering tube, in collapsing one portion of said tube to wit—that in process of being covered,—in inflating the covered portion, and in subjecting said inflated portion to heat until properly vulcanized, substantially as and for purposes explained.

3. The method of producing woven rubber hose which consists first in collapsing a continuous rubber tube and inclosing the same while in a state of collapse with a textile covering, secondly in inflating said rubber tube as it is advanced after being covered, thirdly winding the inflated product upon a reel, severing such coiled portion and sealing the ends thereof, fourthly and lastly subjecting such severed coiled product to heat until vulcanization is effected, substantially as specified.

In testimony whereof I affix my signature in presence of two witnesses.

NATHANIEL LOMBARD.

Witnesses:
H. E. LODGE,
FRANCIS C. STANWOOD.